US006657322B2

(12) United States Patent
Skibinski et al.

(10) Patent No.: US 6,657,322 B2
(45) Date of Patent: Dec. 2, 2003

(54) CONTROL SYSTEM FOR ACTIVE POWER FILTERS

(75) Inventors: Gary Leonard Skibinski, Milwaukee, WI (US); Dongsheng Zhou, Cedarburg, WI (US); Frederick Louis Hoadley, Mequon, WI (US); Naihu Li, Shanghai (CN); Qiang Yin, Shanghai (CN)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 168 days.

(21) Appl. No.: 09/968,114

(22) Filed: Oct. 1, 2001

(65) Prior Publication Data

US 2003/0062776 A1 Apr. 3, 2003

(51) Int. Cl.[7] .............................. H02M 1/12; G05F 1/70
(52) U.S. Cl. .......................... 307/105; 363/89; 323/207
(58) Field of Search ........................... 307/105; 363/89, 363/44, 84, 47, 39, 40, 71; 323/207, 205; 327/552

(56) References Cited

U.S. PATENT DOCUMENTS

| | | | |
|---|---|---|---|
| 5,063,532 A | | 11/1991 | Takeda et al. |
| 5,384,696 A | * | 1/1995 | Moran et al. .................. 363/10 |
| 5,567,994 A | | 10/1996 | Davis et al. |
| 5,648,894 A | * | 7/1997 | DeDoncker et al. .......... 363/39 |
| 5,910,889 A | * | 6/1999 | Larsen et al. .................. 363/40 |
| 6,075,350 A | * | 6/2000 | Peng ........................... 323/207 |
| 6,297,980 B1 | * | 10/2001 | Smedley et al. .............. 363/89 |

* cited by examiner

Primary Examiner—Gregory J. Toatley, Jr.
(74) Attorney, Agent, or Firm—Quarles & Brady LLP; Alexander M. Gerasimow; William R. Walbrun (57) ABSTRACT

An active filter controller for use with both pure and hybrid shunt filters wherein the controller maintains a minimum DC bus voltage required to generate a compensating current on coupling lines and also extrapolates to estimate an expected feedback current to be compensated so that compensation currents are more accurate and harmonic currents are appreciably reduced.

20 Claims, 7 Drawing Sheets

Fig. 3 Modified

CONTROL SYSTEM FOR ACTIVE POWER FILTERS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention concerns electrical filters for eliminating transients and distortion in an alternating current (AC) utility grid and more specifically to active filters for such use.

Ideally, a utility grid for providing three phase AC power to factories and offices (i.e., industrial environments) includes three AC power conductors or lines, each line providing a pure sine wave of current and voltage, the sine waves having equal and constant amplitude and frequency, and each separated from the others by 120°. The utility lines are linked to facility coupling lines at a point of common coupling (PCC) (i.e., a utility-customer connection point) which in turn provide power to facility equipment. As well known in the power industry, all power electronic equipment can potentially act as non-linear loads creating utility line disturbances and distorting utility waveforms by injecting harmonic currents into the utility grid.

Figure 1:
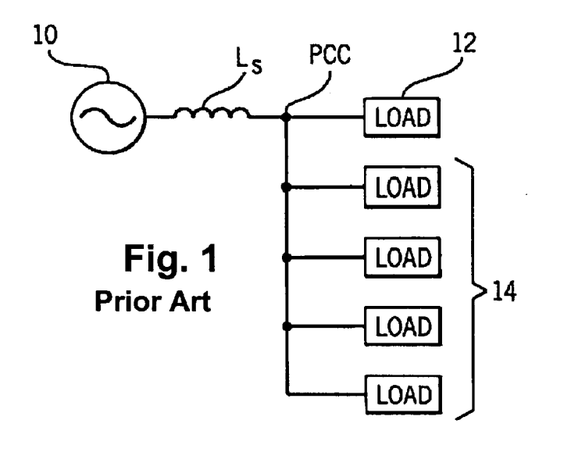
FIG. 1 is a schematic diagram of a power delivery source.

To illustrate the effects of distorting currents on a utility power grid, consider FIG. 1 wherein a utility source 10 is shown connected at a point of common coupling (PCC) to a load 12 (e.g., a first utility customer) and other loads (e.g., other utility customers) represented collectively by numeral 14. The lines that link the PCC to loads 12, 14 are referred to herein as coupling lines. The utility source 10 includes a finite internal impedance Ls. Due to impedance Ls, when load 12 draws a non-sinusoidal current from source 10, the waveform through the coupling lines and at the PCC becomes distorted with harmonic coupling line currents that can cause machinery and equipment connected at the other loads 14 to malfunction.

In addition to voltage waveform distortion at the PCC, other problems related to harmonic currents include additional heating and possibly over voltages in utility distribution and transmission equipment, errors in metering and malfunctioning of utility relays, interference with communication and control signals and equipment damage from voltage spikes created by high frequency resonance's.

Unfortunately, harmonic or non-linear loads comprise an ever increasing portion of the total load for a typical industrial plant. In fact, by 1992, harmonic loads had become such a pervasive problem that the Institute of Electrical and Electronic Engineers (IEEE) recommended stringent harmonics standards, including strict utilities limitations, in a document referred to in the industry as IEEE Standard 519 which has generally been accepted in North America. Standard 519 was written with the general understanding that harmonics should be within a reasonable limit at the PCC and therefore puts limits on individual load and total (i.e., distortion from all loads connected at a PCC) harmonic distortion.

One potential source of utility grid distortion includes power electronics required to modify utility voltages for driving motors. Generally, power electronic systems for receiving and converting utility voltages into AC voltages suitable for driving an AC motor include two converter stages, the first converter stage being a rectifier stage and the second converter stage being an inverter stage. The rectifier stage receives and converts the AC utility voltages to DC voltage and provides the DC voltage across positive and negative DC buses. The inverter stage receives and converts the DC voltage to AC voltages, usually at a different frequency and amplitude than the utility voltages, and provides the converted AC voltages to motor terminals to drive a motor.

One way that has been adopted in many applications to reduce harmonic distortion at the PCC is to position passive filters between harmonic generating loads (e.g., motor drives at an industrial facility) and the PCC. Passive filters typically include inductor and capacitor configurations designed to have a series resonance at the harmonic frequencies to be mitigated. While simple in design, unfortunately such passive filters have a number of shortcomings. First, passive filters are typically bulky and expensive. Second, passive filters cannot adapt to changes in harmonic frequencies caused by shifts in the fundamental AC frequency. Third, passive filters cannot account for variations in the series impedance of the utility grid.

The disadvantages associated with passive filters may be overcome by use of active filters in which a compensating power source is connected directly to the coupling lines to provide a countervailing or compensating current that effectively cancels the distorting harmonic currents. Harmonic currents, like the fundamental line current, are sometimes positive and sometimes negative (i.e., have positive and negative segments). For this reason, in order to eliminate harmonic currents, compensating active filters must be able to operate as both a current sink during positive harmonic segments and as a current source during negative harmonic segments.

To this end many active filters include a pulse width modulating (PWM) inverter controllable to provide current/voltage to, or sink current/voltage from, a line. To sink and provide power, the PWM power source in many active filters comprises a simple power capacitor linked in parallel with a PWM inverter bridge across positive and negative DC buses. The power capacitor is charged by coupling line harmonics whenever current is sinked from the lines and is discharged whenever used to provide current to the lines.

Active filters can generally be grouped into two different categories including pure shunt active filters and hybrid shunt active filters. U.S. Pat. No. 5,063,532 (hereinafter "the '532 patent") which issued on Nov. 5, 1991 and is entitled "Active Filter Device", describes an exemplary pure shunt active filter. The '532 patent filter senses coupling line currents, identifies harmonic current waveforms in each line current, compares compensating currents to the harmonic waveforms, adjusts pulse width modulating (PWM) firing signals as a function of the difference between the compensating and harmonic currents and controls a PWM inverter via the firing signals. PWM inverter output lines are linked to the three coupling lines to provide the compensating currents directly thereto thereby eliminating or substantially mitigating coupling line harmonics.

U.S. Pat. No. 5,567,994 (hereinafter "the '994 patent) which issued on Oct. 22, 1996 and is entitled "Active Harmonic Filter With Time Domain Analysis" describes an exemplary hybrid shunt active filter that, like the pure shunt filter, senses line currents on coupling lines and identifies harmonic current waveforms in each line current. Unlike the pure shunt filters, the hybrid filter does not include a feedback loop that compares the compensating and harmonic currents. Instead, hybrid filters simply generate PWM firing pulses calculated to generate compensating voltages that should cancel the harmonic currents and then applies compensating voltages to the lines via transformers and passive filters.

While each of the pure and hybrid shunt filters have several advantages, each also has several shortcomings. For example, it has been determined through experimentation that the power capacitor employed in the filters may not alone be able to maintain sufficient charge or may become overcharged during the compensating process. To this end, it should be appreciated that the power capacitor cannot cause a desired compensating current on a linked coupling line unless the capacitor charge exceeds the coupling line voltage level. Where harmonic currents are relatively more negative than positive (i.e., provide a negative DC offset), the DC bus capacitor charge is quickly drained and the capacitor ceases to operate as a compensating source. Similarly, where harmonic currents are relatively more positive than negative (i.e., provide a positive DC offset), the DC bus capacitor may quickly become excessively charged and, where charge is not limited, may be damaged or destroyed.

As another example, in each of the pure and hybrid shunt cases, it has been determined that processing speed is often to slow to compensate for harmonic currents in essentially real time. To this end, in order to cancel harmonic currents, compensating currents must be equal and opposite to the undesired harmonic currents. Accordingly, harmonic current phases and amplitudes must be accurately determined.

There are a number of methods of identifying harmonic current properties including use of analog filter circuits and digital signal processing. Analog filters have the disadvantages of being extremely sensitive to the values of their components and thus being subject to drift in filter frequency and degradation in performance. Frequency domain digital signal analysis techniques (e.g., Fast Fourier Transform) can be extremely stable but are not presently fast enough to provide accurate real time control necessary for the harmonic current mitigation with the current generation of industrial computers.

The '994 patent hybrid filter teaches one method for relatively quickly and generally accurately determining harmonic current properties. To this end, the '994 patent filter samples line currents on each of the three coupling lines N times each signal cycle and uses a lookup table to identify voltages for each line N times every cycle, transforms the three phase currents and voltages to two phase, calculates average real and imaginary powers and other related electrical parameters and uses the electrical parameters to identify an effective fundamental sine wave current which is subtracted from the measured coupling line currents to produce accurate two phase harmonic currents. The two phase harmonic currents are then transformed back into three phase currents and used to generate PWM firing pulses that produce compensating currents.

The '994 patent filter is relatively fast for two reasons. First, by transforming the currents to two phase and carrying out most calculations using two phase data the number of calculations are substantially reduced. Second, the sampling rate N is selected to be a number related to the processor structure. More specifically, N is a multiple of 2 so that the averaging process can be performed by simply shifting a total (i.e., the sum of powers over a cycle period) to the left. For instance, where N is 256, the averaging process can be performed by shifting the total leftward by 8 places.

While fast, the '994 patent method cannot be performed instantaneously and therefore PWM adjustments to eliminate harmonics are always performed slightly after the occurrence of a harmonic distortion. Despite reducing harmonic distortions appreciably, the resulting line currents still have some residual distortions due to compensation delay. To this end, see FIG. G which illustrates an exemplary coupling line current that occurs in a system employing a '994 patent filter.

One other shortcoming regarding the active filter industry generally is that industry members typically concentrate on developing control algorithms and corresponding controllers separately for each new type of filter design. Thus, for instance, one algorithm is developed for a hybrid shunt filter while another algorithm is developed for a pure shunt filter. As in any industry, every new development effort is expensive and implementation and support for each algorithm and controller is expensive.

Thus, it would be advantageous to have a controller and corresponding algorithm that avoids problems associated with filter power capacitor charge, essentially eliminates residual harmonics due to calculation delays and that is useable in each of pure shunt and hybrid shunt active filter systems.

BRIEF SUMMARY OF THE INVENTION

An exemplary embodiment of the invention includes an active filter controller for use with both pure and hybrid shunt filters wherein the controller maintains a minimum DC bus voltage required to generate a compensating current on coupling lines and also extrapolates to estimate an expected feedback current to be compensated so that compensation currents are more accurate and harmonic currents are appreciably reduced.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

DETAILED DESCRIPTION OF THE INVENTION

While the following description details various blocks, steps, and functions, it should be understood that all of these elements are meant to be implemented in software as computer programs and represent algorithms for execution by a conventional-type digital processor adapted for industrial applications, such as a model TMS320LF2407 digital signal processor as supplied by Texas Instrument, Texas.

Figure 2:
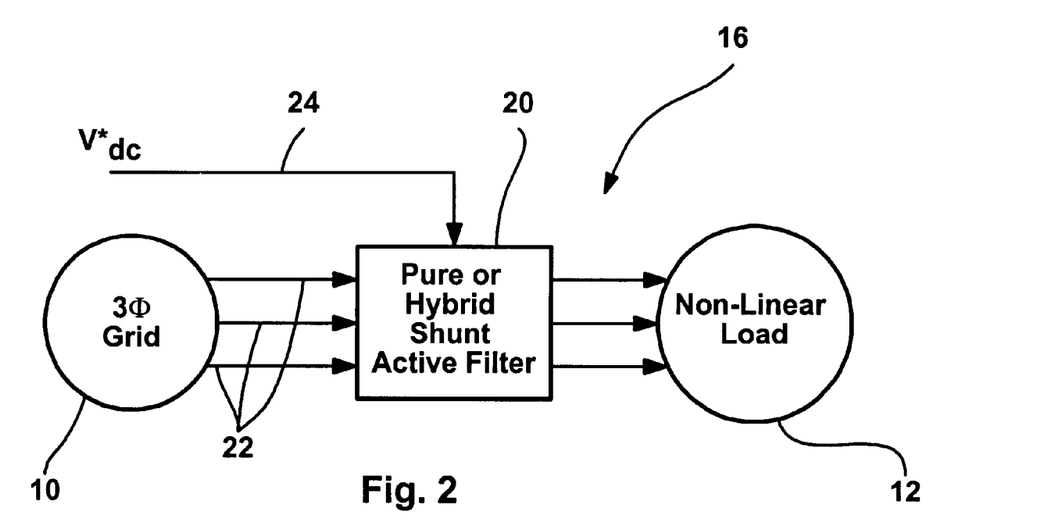
FIG. 2 is a schematic diagram of an active filter, either pure shunt or hybrid shunt, linked between a utility grid and a non-linear load according to present invention.

Referring now to FIG. 2, the inventive active filter 20 will be described in the context of a power system 16 including a 3 phase utility grid 10 linked to a non-linear load 12 via three supply lines collectively identified by numeral 22. Filter 20 is disposed between grid 10 and load 12 sampling currents through lines 22, identifying harmonic currents therein and providing countervailing or compensating currents on lines 22 that effectively cancel the harmonics.

One signal provided by a system operator is a command DC voltage signal $V^*_{dc}$ via an input line 24. Signal $V^*_{dc}$ is set to a value which is greater than the expected peak coupling line voltage $V_{peak}$ (i.e., greater than the expected peak voltage on coupling lines 22). For example, signal $V^*_{dc}$ may be set to 103% of the peak line voltage $V_{peak}$. To ensure that signal $V^*_{dc}$ is greater than voltage $V_{peak}$, signal $V^*_{dc}$ in a preferred embodiment is set to 120% of the peak voltage $V_{peak}$. Signal $V^*_{dc}$ is used by filter 20a to set the value of the DC bus power capacities in a manner described in more detail below.

Filter 20 may be either a pure shunt active filter or a hybrid shunt active filter. In either case, filter 20 includes essentially the same controller architecture and runs a similar algorithm to control other filter hardware to essentially eliminate coupling line harmonics. Hereinafter, while the controller architecture is the same for each filter type, because each filter type includes other additional hardware, each filter type will be described separately.

In the following description similar elements in each of the pure and hybrid filter designs are identified by similar numbers followed by a small case letter "a" or "b", respectively. For instance, a pure shunt controller is identified as 30a in FIG. 3 and a hybrid shunt controller is identified as 30b in FIG. 4 to indicate the similarity between the controllers. Similarly, inverters in each of FIGS. 3 and 4 are identified as 40a and 40b, respectively.

Pure Shunt Active Filter

Figure 3:
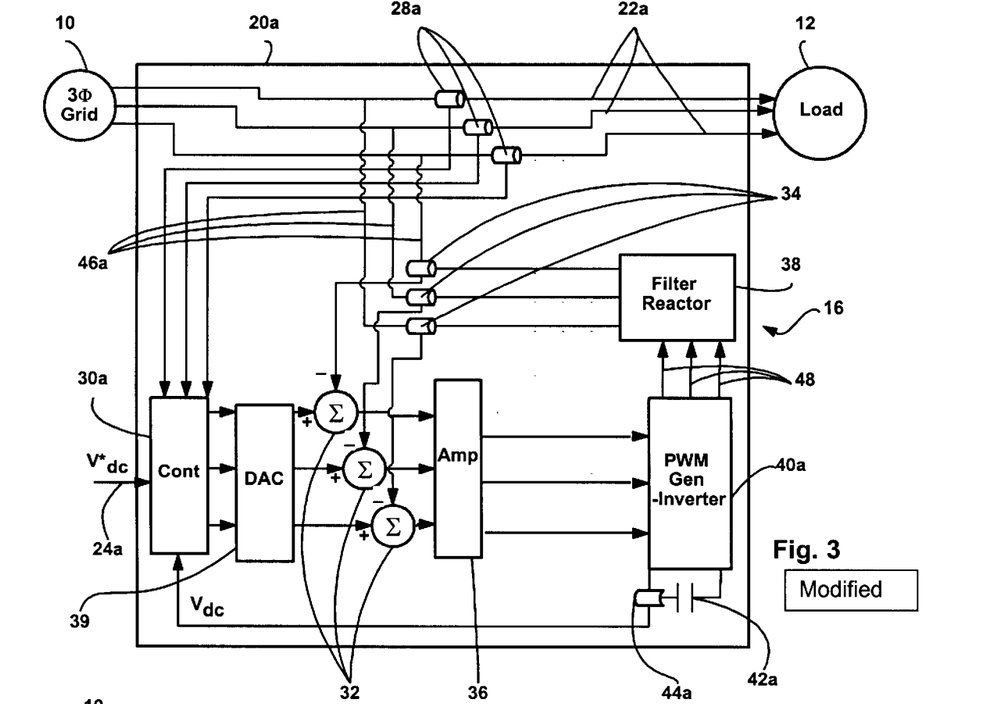
FIG. 3 is a schematic diagram of a pure shunt active filter according to present invention.
Figure 4:
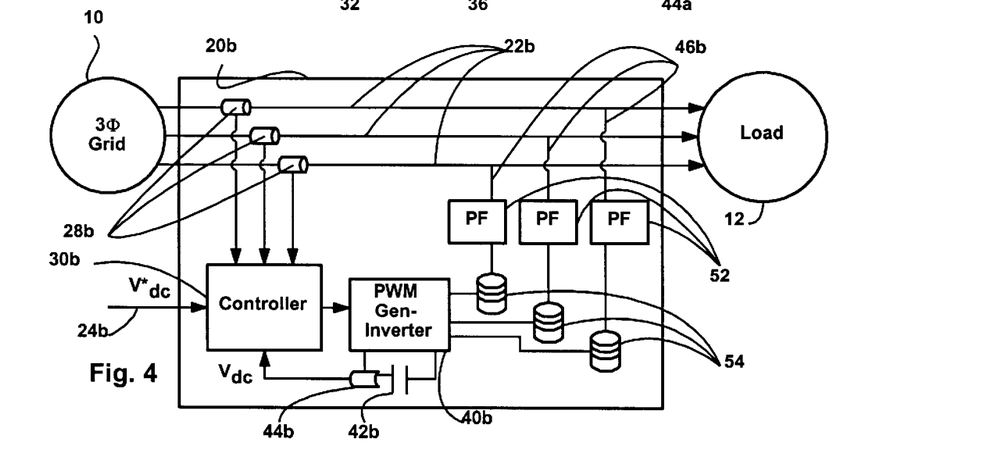
FIG. 4 is similar to FIG. 3 albeit of a hybrid shunt active filter according to present invention.

Referring now to FIG. 3, a schematic diagram of a pure shunt active filter 20a is illustrated as linked to coupling lines 22a between grid 10 and load 12. Filter 20a includes, among other components, a first set of three current sensors collectively identified by numeral 28a, a controller 30, a first set of three summers 32, a second set of three current sensors collectively identified by numeral 34, an amplifier circuit 36, a filter reactor 38, a PWM generator/inverter 40a (hereinafter "inverter 40"), a DC bus power capacitor 42a, a voltage sensor 44a and a digital to analog converter 39. Filter 20a obtains current signals on lines 22a and causes harmonic filter canceling currents onto lines 22a via filter compensating lines collective identified by numeral 46a, a separate one of lines 46a linked to each of coupling lines 22a. To this end, a separate current sensor 28a (e.g., Hall effect) is linked to each of coupling liner 22a and provides a line current signal to controller 30a.

With the exception of some processing that occurs within controller 30 there are generally three parallel paths through filter 20a, a separate path corresponding to each of coupling lines 22a. To simplify this explanation, unless indicated otherwise, only a single filter path will be described here in detail as processing along all of the paths outside controller 30a is essentially identical.

In addition to receiving current signals from sensors 28a, controller 30a also receives the DC bus command signal $V^*_{dc}$. Controller 30a uses the received signals to identify three harmonic current signals, one harmonic current signal corresponding to each of coupling lines 22a, and provides the harmonic current signals to DAC 39. The algorithm used by controller 30a is described in detail below. DAC 39 converts the harmonic current signals from digital to analog and provides each of the three analog signals to a separate one of summers 32.

A separate one of current sensors 34 is linked to each of compensating lines 46a, each sensor 34 providing a feedback compensating current signal to one of summers 32. The sensor 34 linked to the compensating line 46a that is linked to a specific coupling line 22a provides its feedback signal to the summer 32 that receives the harmonic current signal corresponding to the specific coupling line 22a. Each summer 32 subtracts the compensating signal (i.e., the signal from sensor 34) from the harmonic signal (i.e., the signal from controller 30a) and provides the difference to amplifier circuit 36. The output of circuit 36 is provided to inverter 40a.

Inverter 40a includes a PWM generating circuit and a three phase switching bridge disposed between positive and negative DC rails. The DC rails are separated by DC bus power capacitor 42a. As indicated above, capacitor 42a is charged by current from lines 22a that is effectively regenerated through inverter 40a during the harmonic eliminating process. Voltage sensor 44a is linked to capacitor 42a and provides a DC bus voltage signal back to controller 30a indicating the value of the DC bus voltage. Inerter 40a output lines collectively identified by number 48 are linked through filter reactor 38 to compensating lines 46a and coupling lines 22a.

The voltage across capacitor 42a is PWM modulated to generate inverter output voltages across reactor 38 and causes compensating currents to flow therethrough. Thus, generally, based on information about current flow received by the active filter 20a via sensors 28a, corrective compensating currents are caused to flow through reactor 38 to eliminate the harmonic distortion caused on grid 10.

Figure 7:
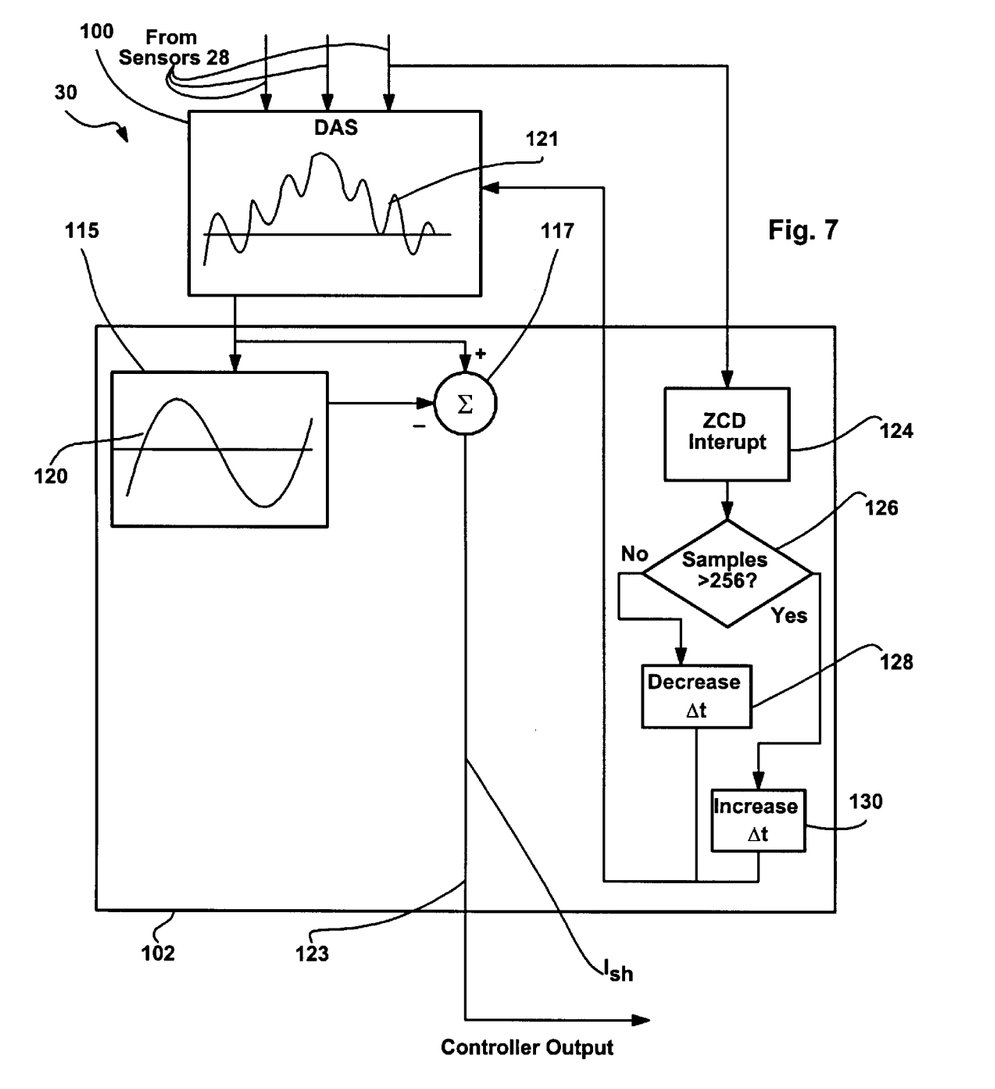
FIG. 7 is a schematic diagram illustrating the controller included in each of FIGS. 3 and 4.

Referring still to FIG. 3 and also to FIG. 7, exemplary controller 30a includes a data acquisition system (DAS) 100 and a processor 102. DAS 100 samples current signals on coupling lines 22a at discrete intervals in time and digitizes those sample values to generate digitized data points that are provided to processor 102. The binary words are then processed by processor 102 to generate harmonic current output signals that are provided to DAC 39. Processor 102 performs two general functions. First, processor 102 controls DAS sampling rate to ensure that the sampling rate remains constant and ideal. Second, processor 102 obtains DAS 100 output and uses the output to identify harmonic coupling line currents. To control the sampling rate, processor 102 runs an interrupt algorithm corresponding to process blocks 124, 126, 128 and 130 described in more detail below. To identify the harmonic coupling line currents, processor 102 includes a fundamental current identifying module 115 and a summer 117. Some theory is helpful at this point in order to understand how processor 102 is employed.

Figure 8:
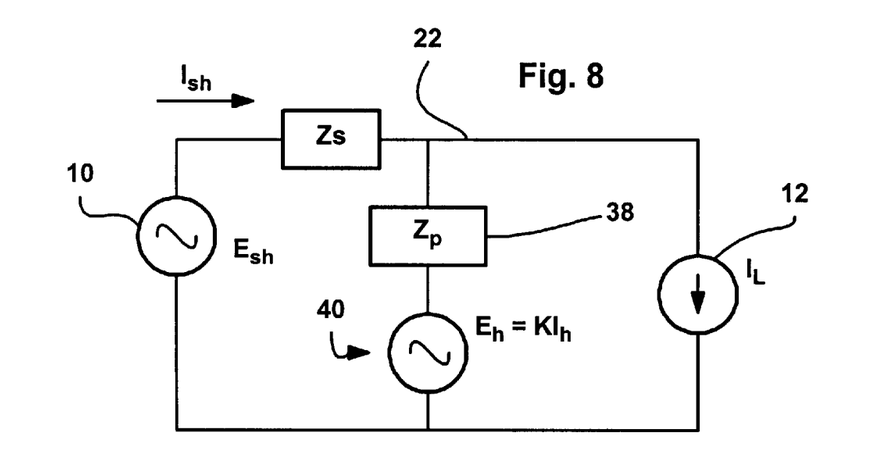
FIG. 8 is a schematic representation of an equivalent circuit of the filter and grid of FIG. 3 or FIG. 4 for one phase; and one harmonic frequency.

Referring now to FIGS. 3 and 8, a single phase of grid 10 for a single harmonic frequency may be modeled as an AC voltage source producing a sine wave voltage at the harmonic frequency $E_{sh}$ in series with a source impedance $Z_s$. When connected to a load 12 that draws a current $I_L$, a harmonic current $I_{sh}$ flows from grid 10.

For a single phase (one line 22a), a single reactor winding 38 shunts load 12. The winding provides an impedance $Z_p$ in series with a variable voltage source. The voltage source is realized by the PWM power supply 40a described above. The purpose of the voltage source 40a is to cancel the harmonic currents $I_{sh}$. Therefore the voltage $E_h$ of the voltage source 40a will ideally equal a constant K times the harmonic current $I_{sh}$.

Applying well known circuit analysis laws to the schematic of FIG. 8 provides the following relationship controlling the harmonic current:

$$I_{sh} = \frac{Z_P}{Z_S + Z_P + K} I_L + \frac{1}{Z_S + Z_P + K} E_{sh} \qquad \text{Eq. 1}$$

As is apparent from Equation 1, when K is much greater than $Z_p$, $Z_s$, then the harmonic current $I_{sh}$ approaches zero. In order to generate voltage $E_h$ with voltage source 40a (i.e., inverter 40a), it is necessary to accurately know the harmonic current $I_{sh}$ in a near instantaneous manner so that a real-time correction current-$I_{sh}$ may be generated.

Referring again to FIGS. 3 and 7, harmonic coupling line components $I_{sh}$ are rapidly determined by processing the current signals for each line 22a to extract a pure sine wave current 120a that would deliver an equivalent average power to load 12. This sine wave current 120a is then subtracted (see summer 117) from the actual current signals 121 to produce the harmonic current $I_{sh}$ on a line 123. Note that harmonic current $I_{sh}$ is a sum of all harmonic currents. Thus, as a first step, sine wave current 120a is computed from current signals received by DAS 100.

Referring still to FIGS. 3 and 7, this first step requires that data points be collected at regular intervals of time Δt from the current sensors 22a by DAS 100. The timing of the acquisition of these data points is controlled by an internal timer within controller 30a which signals DAS 100 to acquire each data point. The timer is programmable so that the time value Δt may be changed by controller 30a running the zero interrupt algorithm.

The values of the data points are stored in controller memory (not shown) within controller 30a in a "rolling" buffer so that the most recently sampled data points are inserted at the front of the buffer and the oldest data points are removed from the back of the buffer so that always the most recent 256 data points are present in the buffer in numeric order from front to back.

The interrupt routine represented by blocks 124, 126, 128 and 130 will now be explained. At process block 124 representing a first program step in the interrupt routine, a zero crossing of one current signal 121 is detected by processor 102, which causes the processor 102 to suspend its main program and to execute steps corresponding to blocks 126, 128 and 130. At decision block 126, the number of data points or samples acquired since the last interrupt is examined. If the number of samples is greater than 256, then at process block 128, processor 102 reprograms a timer to increase the Δt value. Conversely, if the number of samples is less than 256, then at process block 130, processor 102 reprograms the timer to decrease the Δt value. In either case, at the next step, the interrupt routine is concluded and processor 102 returns to its normal processing.

Thus, the interrupt routine adjusts the value of Δt so that 256 samples are obtained during a typical cycle of the three-phase grid. For instance, for a 60 Hz signal, Δt will be approximately 25 microseconds. As will be described further below, by ensuring that there are 256 samples in each cycle of the fundamental frequency of the power on grid 10, the speed with which the necessary calculations, to be described below, can be performed, is increased significantly.

When processor 102 is not executing the interrupt routine or the interrupt driven sampling of the current signals, processor 102 executes a main program which calculates the harmonics on coupling lines 22a.

Referring to FIG. 8, the main program 69 (i.e., the harmonic identifying program) performed by processor 102 is illustrated. At block 70 a system user provides the minimum DC bus voltage value $V^*_{dc}$ via an input device. As indicated above, minimum value $V^*_{dc}$ must be at least slightly greater (e.g., 2–3% greater) than the expected peak coupling line voltage and preferably will be approximately 20% greater.

Referring also to FIGS. 3 and 7, at block 72, DAS 100 samples the line currents on each of lines 22a and provides the current signals to processor 102. At block 74, processor 102 uses a lookup table to identify a sine value voltage E. The sine values are of arbitrary phase and amplitude with respect to the voltage signals at lines 22a but have the same frequency as the current signals 121 of the three-phase grid 10. This matching of frequencies is ensured by having the lookup table include 256 entries for 360° of a sine function. Because the number of samples of current signal 121 is constantly adjusted by the interrupt program of to be exactly 256 samples, frequency equivalence between the I and E data is naturally obtained. Thus, at the conclusion of process block 74, six samples are obtained, a separate current sample for each of three coupling lines 22a and a separate voltage value E for each of lines 22a. Block 76 is described below and this explanation continues with block 84 at this point.

Figure 6A:
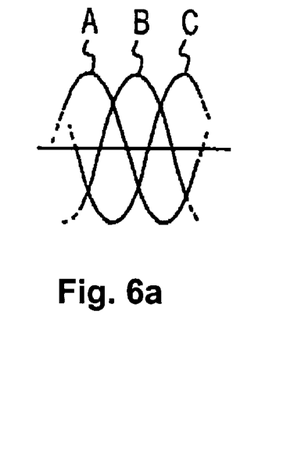
FIGS. 6a-(c) are three representations of the same three phase current: platted as a graph against time, represented as three vectors in a rotating coordinate system, and represented as two perpendicular vectors after a Park transformation.
Figure 6B:
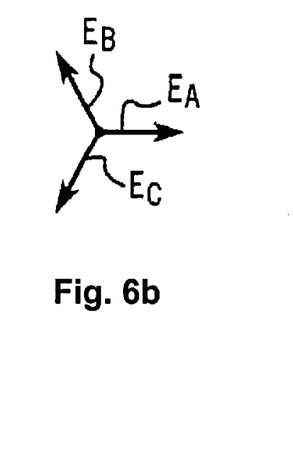

Referring now to FIG. 6a, each of three phases of a typical three-phase system labeled A, B, and C are shown plotted against time. The phase difference between the phases A, B, and C is approximately one-third of a cycle or 120°. As shown in FIG. 6b, these phases may be represented by a vector diagram showing three vectors $E_A$, $E_B$, and $E_C$ extending at 120° separations from a common vertex. In this representation, the length of the vector represents the amplitude of the phase and the angle of the vector with respect to other vectors represents the phase difference between the phases. Generally, if the vector diagram of FIG. 6b were rotated about the vertex, the projection of each vector or dot product of the vector with an axis would produce the waveforms of the FIG. 6a. A similar set of waveforms and vector diagrams can be generated for the currents on a three-phase grid 10.

Figure 6C:
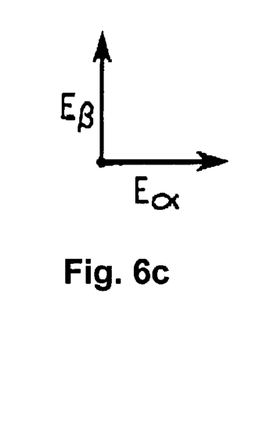

The representation of FIG. 6b includes redundant information and may be reduced to a two vector representation of FIG. 6c without loss of information by a Park Transform as well known in the art. The Park transformation is done on a sample-by-sample basis as indicated by process block 84 and reduces the number of subsequent calculations.

At process block 86, four different instantaneous power quantities are identified includes: real powers represented by Equations 2 and 3 and "imaginary" powers represented by Equations 4 and 5.

$$P_\alpha(t) = e_\alpha(t) \cdot i_\alpha(t) \qquad \text{Eq. 2}$$

$$p_\beta(t) = e_\beta(t) \cdot i_\beta(t) \qquad \text{Eq. 3}$$

$$q_\alpha(t) = -e_\beta(t) \times i_\alpha(t) \qquad \text{Eq. 4}$$

$$q_\beta(t) = e_\alpha(t) \times i_\beta(t) \qquad \text{Eq. 5}$$

Figure 9:
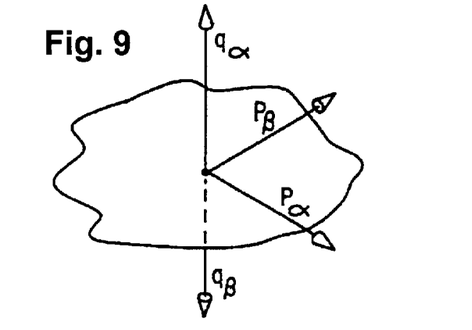
FIG. 9 is a three dimensional vector representation of four power quantities calculated from the Park transformation of three phase current per FIG. 6c.

The imaginary powers are cross products of the two vector quantities shown and generally reflect reactive components in load 12. A vector representation of these different powers is shown in FIG. 9 in which the reactive powers $q_\alpha$ and $q_\beta$ are perpendicular to the plane of $p_\alpha$ and $p_\beta$ according to the right-hand rule and the convention for cross products.

Next, at process block 86, average values of real and imaginary power are computed as indicated by Equations 6 through 9 where T is one cycle of the waveforms on grid 10.

$$P_\alpha = \frac{1}{T}\int_0^T p_\alpha(t)\,dt \qquad \text{Eq. 6}$$

$$P_\beta = \frac{1}{T}\int_0^T p_\beta(t)\,dt \qquad \text{Eq. 7}$$

$$Q_\alpha = \frac{1}{T}\int_0^T q_\alpha(t)\,dt \qquad \text{Eq. 8}$$

$$Q_\beta = \frac{1}{T}\int_0^T q_\beta(t)\,dt \qquad \text{Eq. 9}$$

Processor 102 solves Equations 6 through 9 by adding the new values of instantaneous real power and instantaneous imaginary power, computed from the latest values of I and E, to running totals for the last 256 such calculations while subtracting instantaneous real power and instantaneous imaginary power computed from the values of I and E taken 257 samples ago. This new total is then divided by 256.

Thus, the average power is recomputed at the acquisition of each new data point but requires only three simple operations. A division by 256 may be performed rapidly via processor 102 by simply shifting the binary number representing the totals leftward by eight places, a basic computer instruction. Thus, the calculations of Equations 6 through 9 are performed rapidly in between the acquisitions of samples.

In addition, mean values of the Park transform of the voltages in the lookup table in processor 102 is undertaken per Equations 10 and 11 respectively, using the same procedure described above of modifying a running total by the newest and oldest points and dividing by the total number of points 256 through a leftward shift.

$$V_\alpha^2 = \frac{1}{T}\int_0^T V_\alpha^2(t)\,dt \qquad \text{Eq. 10}$$

$$V_\beta^2 = \frac{1}{T}\int_0^T V_\beta^2(t)\,dt \qquad \text{Eq. 11}$$

Figure 5:
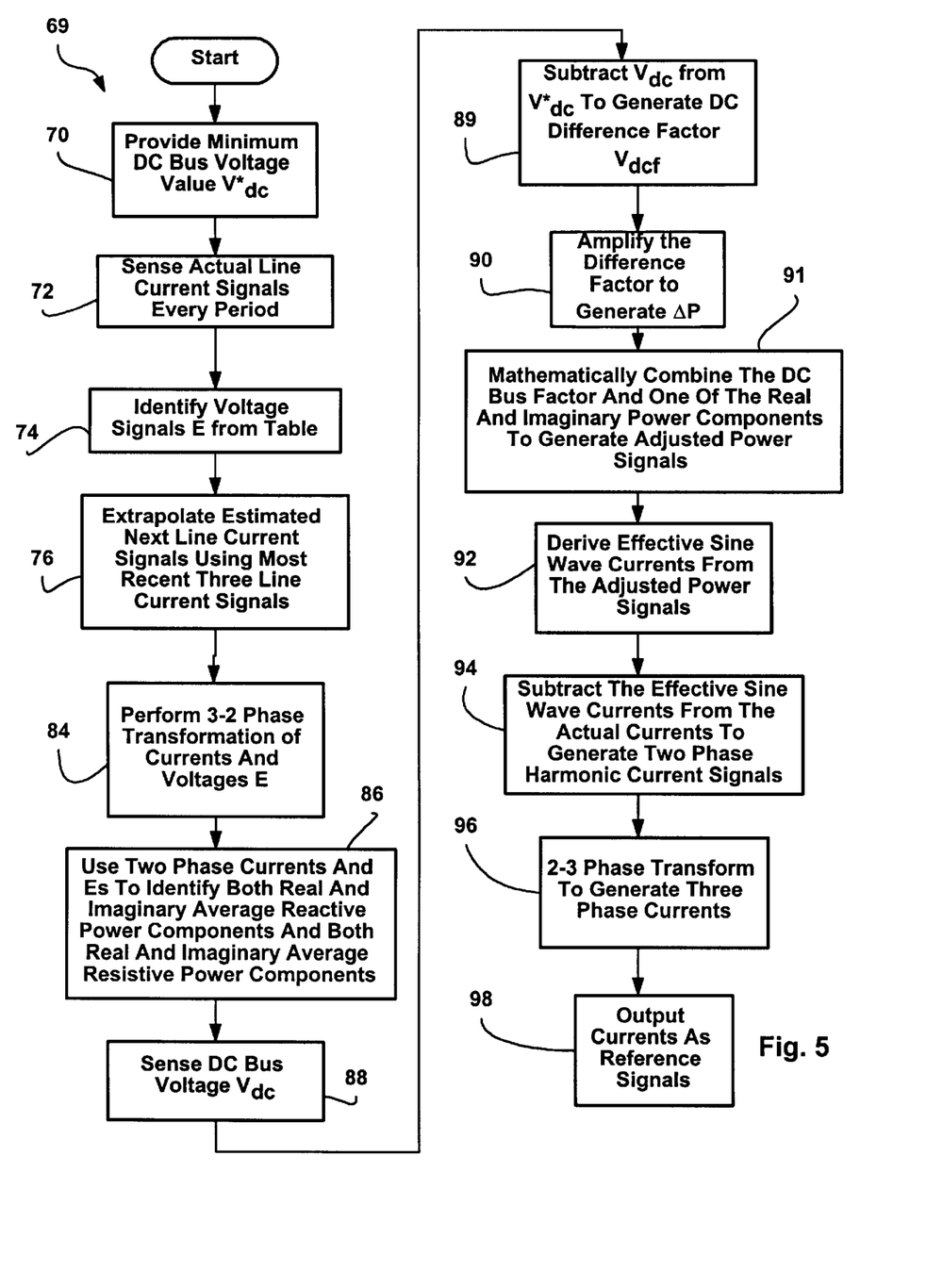
FIG. 5 is a flowchart of an invented method according to present invention.

Referring still to FIGS. 3 and 5, at block 88 processor 102 samples the DC bus voltage from sensor 44. At block 89, processor 102 subtracts the sampled DC bus voltage $V_{dc}$ from the provided minimum voltage value $V^*_{dc}$ to generate a DC difference factor $V_{dcf}$. At block 90 the difference factor $V_{dcf}$ is amplified via a PI controller to generate a DC bus factor $\Delta P$.

At block 91, processor 102 mathematically combines the DC bus factor $\Delta P$ and, in the case of the pure shunt filter of FIG. 3, the real average power components, to generate adjusted power signals. Processor 102 accomplishes this combining task by solving the following Equations for adjusted power signals $P_\alpha$ and $P_\beta$:

$$P_\alpha = P_\alpha + \Delta P \cdot (P_\alpha/\sqrt{P_\alpha^2 + P_\beta^2}) \qquad \text{Eq. 12}$$

$$P_\beta = P_\beta + \Delta P \cdot (P_\beta/\sqrt{P_\alpha^2 + P_\beta^2}) \qquad \text{Eq. 13}$$

As indicated by process block 92, an effective sine wave current is next identified by computing an effective average value of the effective load 12 (assuming constant AC voltages) and based on the average powers and voltages previously determined via Equations 8 through 13. This average load has conductance and susceptance components, the conductance being computed by solving Equation 14 and 15 and the susceptance being determined according to Equations 16 and 17.

$$G_\alpha = \frac{P_\alpha}{V_\alpha^2} \qquad \text{Eq. 14}$$

$$G_\beta = \frac{P_\beta}{V_\beta^2} \qquad \text{Eq. 15}$$

$$B_\alpha = \frac{Q_\alpha}{V_\beta^2} \qquad \text{Eq. 16}$$

$$B_\beta = \frac{P_\beta}{V_\alpha^2} \qquad \text{Eq. 17}$$

From these determinations of an average load, values of an effective sine wave current (assuming constant AC voltage) are determined by Equations 18 through 21.

$$i_{\alpha A}(t) = G_\alpha \cdot v_\alpha(t) \qquad \text{Eq. 18}$$

$$i_{\beta A}(t) = G_\beta \cdot v_\beta(t) \qquad \text{Eq. 19}$$

$$i_{\alpha R}(t) = -B_\alpha \cdot v_\beta(t) \qquad \text{Eq. 20}$$

$$i_{\beta R}(t) = B_\beta \cdot v_\alpha(t) \qquad \text{Eq. 21}$$

The four current values must be identified because of the possibility of a reactive component in load 12. The currents of Equations 18 through 21 describe a pure sine wave current that would provide similar power to load 12 as load 12 is actually receiving via currents 121.

The effective sine wave current is then subtracted from the actual measured current to produce the harmonic current 120a as shown in FIG. 7 for both harmonic current and reactive power compensation according to Equations 22 and 23, and per process block 94.

$$i^*_{\alpha HR}(t) = i_\alpha(t) - i_{\alpha A}(t) \qquad \text{Eq. 22}$$

$$i^*_{\beta HR}(t) = i_\beta(t) - i_{\beta A}(t) \qquad \text{Eq. 23}$$

As indicated by process block 96, this computed effective sine wave current is then reverse Park transformed to produce harmonic current values $I_{sh}$ for each of the three phases as known in the art. At process block 98, the harmonic currents for each of the phases are output to DAC 39 which cooperates with summers 32, amplifier 36, summers 37 and inverter 40a to provide the necessary harmonic currents $I_{sh}$ on lines 22a.

Figure 10:
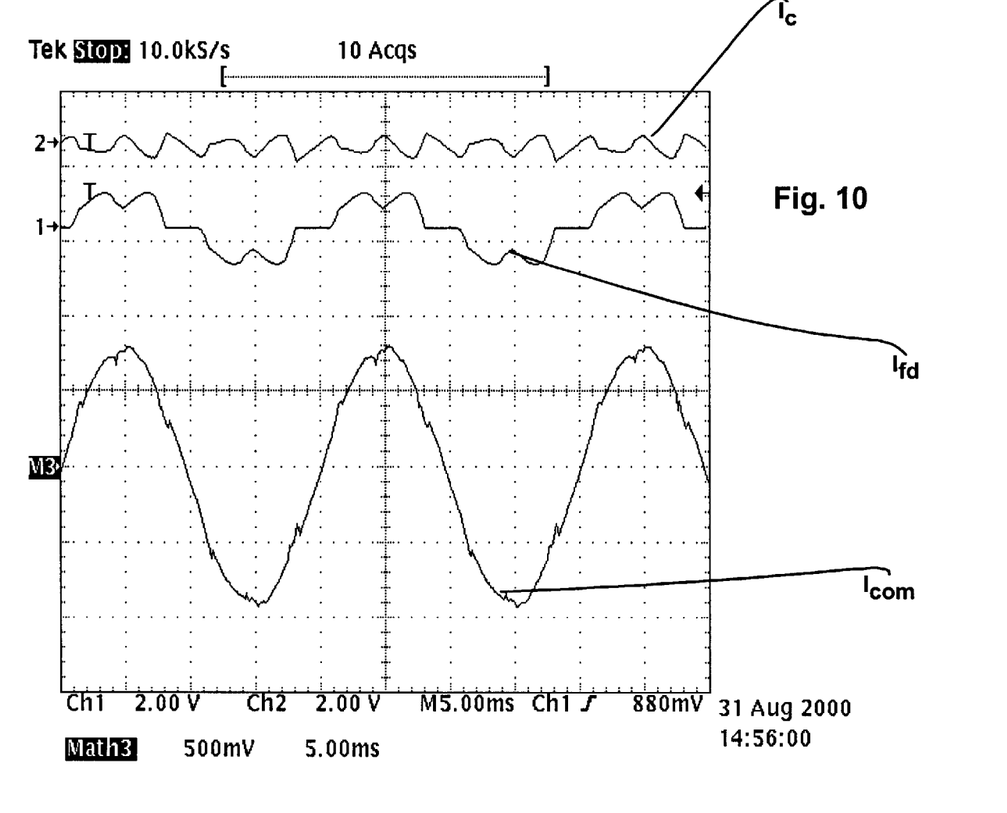
FIG. 10 is a graph illustrating a feedback current and a compensating current and the combination of the feedback and compensating current according to present invention without feedback current extrapolation.
Figure 11:
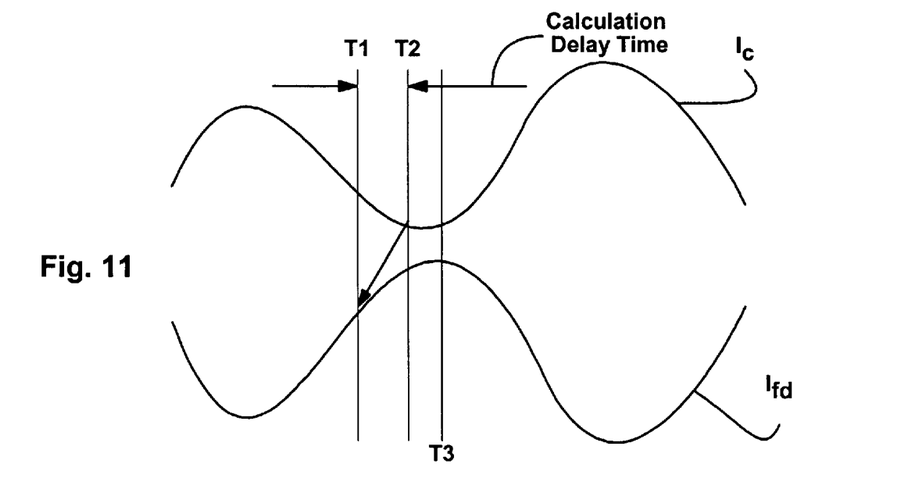
FIG. 11 is a graph illustrating a small portion of the feedback current of FIG. 10.

While the system described above provides relatively good results, it has been determined that, due to lag in processing and correction implementation, small harmonics still occur in the final coupling line currents. To this end, referring also to FIG. 10, a measured coupling line feedback current and corresponding compensating currents $I_{fd}$ and $I_c$, respectively, are illustrated. Clearly, ideally, the combined compensating coupling line curve $I_{com}$ should be purely sinusoidal if the compensating current $I_c$ completely compensates for coupling line harmonics. Referring also to FIG. 11, the disturbances in curve $I_{com}$ indicate inaccurate compensation due to the fact that compensation current $I_c$ at time T2 is calculated based on the feedback current $I_{fd}$ at previous time T1 which occurs one calculation delay time prior to time T2.

Figure 12:
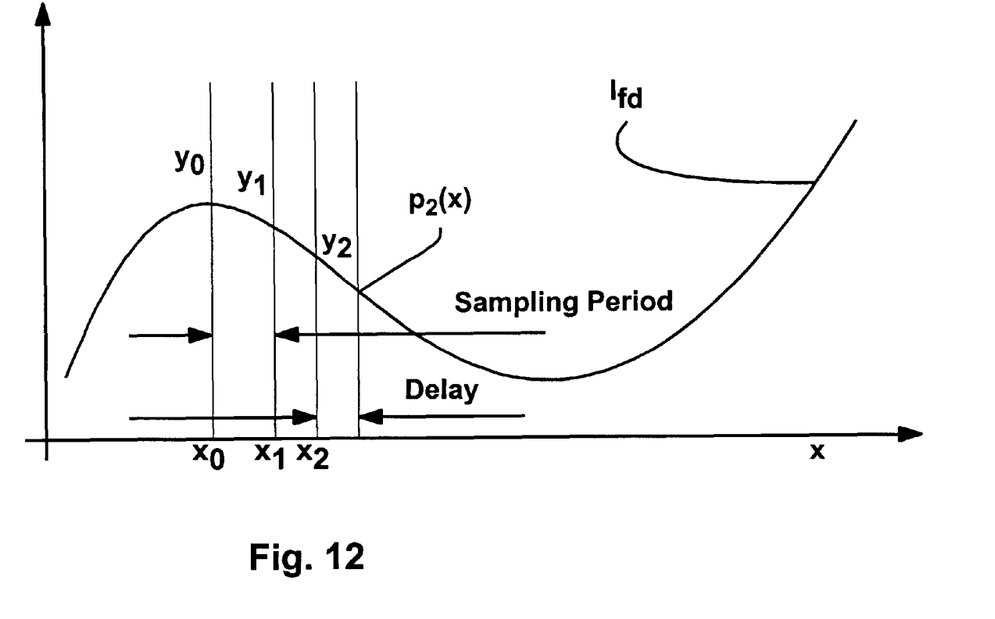
FIG. 12 is a schematic diagram illustrating the same three curves as illustrated in FIG. 10, albeit with the extrapolating feedback current feature activated.

To eliminate the error in the compensating current $I_c$, an extrapolating mathematical method represented by block 76 in FIG. 5 is employed. Generally, using the most recent feedback current signals, the next expected feedback current value is estimated and used to perform the process which follows block 76 in FIG. 5. More specifically, referring also to FIG. 12, the feedback current estimate $I_{fde}$ $I_{fd}$ used to calculate the compensating current $I_c$ may be extrapolated based on the previous two feedback current values $y_0$ and $y_1$ at times $x_0$ and $x_1$ and the most recent current value $y_2$ by solving the following Equations 24–27:

$$P_2(x) = l_0(x) \cdot y_0 + l_1(x) \cdot y_1 + l_2(x) y_2 \qquad \text{Eq. 24}$$

$$l_0(x) = \frac{(x - x_1) \cdot (x - x_2)}{(x_0 - x_1) \cdot (x_0 - x_2)} \qquad \text{Eq. 25}$$

$$l_1(x) = \frac{(x - x_0) \cdot (x - x_2)}{(x_1 - x_0) \cdot (x_1 - x_2)} \qquad \text{Eq. 26}$$

$$l_2(x) = \frac{(x - x_0) \cdot (x - x_1)}{(x_2 - x_0) \cdot (x_2 - x_1)} \qquad \text{Eq. 27}$$

After extrapolation of separate feedback current estimates for each line 22, the estimates $p_2(x)$ are 3-2 phase transformed at block 84 and used with power values determined using Equations 2 through 5 above that correspond to actual feedback currents. Experiments have shown that the end results using this extrapolation method essentially eliminate the residual harmonics shown in FIG. 10.

Hybrid Shunt Active Filter

Referring now to FIG. 4, a hybrid shunt filter 20b according to the present invention is illustrated linked between a three phase grid 10 and harmonic generating load 12. Filter 20b includes three current sensors collectively identified by numeral 28b, a controller 30b, an inverter 40b, a voltage sensor 42b, three transformers collectively identified by numeral 54 and passive filters 52. As in the case of the pure shunt filter described above, in this case, except for within controller 30b, filter 20b forms three parallel circuits, a separate circuit linked to each coupling lines 22b, to identify harmonic currents thereon and provide compensating currents thereto.

To this end, controller 30b receives current signals from each of current sensors 28b and also receives minimum DC bus voltage $V^*_{dc}$ via line 24b as input by a system user and feedback bus voltage signal $V_{dc}$. Referring again to FIGS. 5 and 7, controller 30b has an identical configuration and operates in a similar manner as the controller described above with respect to the pure shunt system. The main difference in controller operations is that different equations are used to generate the harmonics compensating currents and to modify currents to maintain the DC bus voltage level. To this end, at block 91, the step of mathematically combining the DC bus factor and other signals is performed by solving the following equations instead of Equations 22a (12) and 23 (13) above:

$$Q_\alpha = Q_\alpha + \Delta Q \cdot (Q_\alpha / \sqrt{Q_\alpha^2 + Q_\beta^2}) \qquad \text{Eq. 26}$$

$$Q_\beta = Q_\beta + \Delta Q \cdot (Q_\beta / \sqrt{Q_\alpha^2 + Q_\beta^2}) \qquad \text{Eq. 27}$$

Thereafter the effective sine waves are derived at block 92. At block 94, the subtracting step is performed using the following two equations instead of Equations 22 and 23 above:

$$i_{\alpha H}(t) = i_\alpha(t) - i_{\alpha A}(t) - i_{\alpha R}(t) \qquad \text{Eq. 28}$$

$$i_{\beta H}(t) = i_\beta(t) - i_{\beta A}(t) - i_{\beta R}(t) \qquad \text{Eq. 29}$$

Steps 96 and 98 are performed in the manner described above with respect to the pure shunt filter.

Referring again to FIG. 4, digital words are output from controller 30b to inverter 40b causing PWM inverter 40b to generate the described compensating currents on lines 22b.

Thus, it should be appreciated that the invention provides a single active filter controller architecture that can be used to control each of a hybrid active filter and a pure shunt active filter with only minimal modifications to equations performed. In addition, the inventive controller maintains a suitable and necessary DC bus voltage level for compensating purposes. Moreover, the inventive controller reduces harmonics appreciably by estimating future feedback current levels to that immediate compensating currents are relatively more accurate.

It should be understood that the methods and apparatuses described above are only exemplary and do not limit the scope of the invention, and that various modifications could be made by those skilled in the art that would fall under the scope of the invention.

To apprise the public of the scope of this invention, the following claims are made:

What is claimed is:

1. A filter for eliminating harmonic currents from three phase AC supply lines, the AC lines providing actual voltage waveforms and corresponding actual current waveforms including fundamental components and harmonic components flowing through the lines connected to a load, the actual voltage waveforms characterized by a peak value the filter comprising:

current sensors linked to the lines to provide three phase current signals indicating the actual line current waveforms;

a compensator for providing compensating harmonic signals on the lines as a function of control signals, the compensator including a DC bus voltage source that is charged by current sinked from the lines, the DC source characterized by a minimum charge value that is greater than the peak value;

a voltage sensor linked to the DC bus voltage source to provide a voltage signal indicating the DC bus voltage; and a controller for generating the control signals as a function of the actual line current waveforms and the DC voltage difference where the DC voltage difference is the difference between the DC bus voltage and the minimum charge value.

2. The filter of claim 1 wherein the controller runs a pulse sequencing program to determine the power associated with the actual current waveforms, modifies the power as a function of the DC difference and uses the modified power signals to generate the control signals.

3. The filter of claim 2 wherein the controller runs the program to determine the power by converting the three phase currents to two phase currents and using the two phase currents to identify both real and imaginary average reactive power components and both real and imaginary average resistive power components, the controller runs the program to modify the power by identifying a DC bus factor that is a function of the DC difference, mathematically combining the DC bus factor and one of the real and imaginary power components to generate adjusted power signals and the controller runs the program to generate the control signals by deriving effective sine wave currents from the adjusted power signals, subtracting the effective sine wave currents from the actual currents to generate two phase harmonic current signals, transforming the two phase harmonic current signals to three phase harmonic current signals and providing the three phase signals as control signals.

4. The filter of claim 3 wherein the controller runs the program to identify the bus factor by stepping up the bus DC difference via a PI regulator.

5. The filter of claim 4 wherein the filter is a hybrid shunt active filter and wherein the controller runs the program to mathematically combine by converting the bus factor into imaginary reactive and resistive bus factor components and adding the imaginary reactive and resistive bus factor components to imaginary reactive and resistive line power components.

6. The filter of claim 5 wherein the controller runs the program to mathematically combine by solving the following equations:

$$\Delta Q_\alpha = \Delta Q \cdot (Q_\alpha / \sqrt{Q_\alpha^2 + Q_\beta^2})$$

$$\Delta Q_\beta = \Delta Q \cdot (Q_\beta / \sqrt{Q_\alpha^2 + Q_\beta^2})$$

where $Q_\alpha$ is the imaginary resistive power line component, $Q_\beta$ is the imaginary reactive power line component and $\Delta Q$ is the bus factor.

7. The filter of claim 4 wherein the filter is a pure shunt active filter and wherein the controller runs the program to mathematically combine by converting the bus factor into real reactive and resistive bus factor components and adding the real reactive and resistive bus factor components to real reactive and resistive line power components.

8. The filter of claim 7 wherein the controller runs the program to mathematically combine by solving the following equations:

$$\Delta P_\alpha = \Delta P \cdot (P_\alpha / \sqrt{P_\alpha^2 + P_\beta^2})$$

$$\Delta P_\beta = \Delta P \cdot (P_\beta / \sqrt{P_\alpha^2 + P_\beta^2})$$

where $P_\alpha$ is the real resistive power line component, $P_\beta$ is the real reactive power line component and $\Delta P$ is the bus factor.

9. The filter of claim 1 wherein the current sensor provides periodic current magnitude signals and wherein the controller runs a pulse sequencing program to use recent magnitude signals to determine an estimated next magnitude signal and generates the control signals as a function of the actual line current waveforms, the DC voltage difference ad the estimated next magnitude signal.

10. The filter of claim 9 wherein the controller determines the estimated next magnitude signal by extrapolating form the most recent three current samples.

11. A filter for eliminating harmonic currents from three phase AC supply lines, the AC lines providing actual voltage waveforms and corresponding actual current waveforms including fundamental components and harmonic components flowing through the lines connected to a load, the actual voltage waveforms characterized by a peak value the filter comprising:

current sensors linked to the lines to provide three phase current signals indicating the actual line current waveforms;

an extrapolator receiving the current signals and identifying an estimated next current magnitude for each of the current signals;

a controller for receiving the current signals and the estimated next current magnitudes and using the signals and estimates to determine a harmonic-less current waveform matching the power characteristics of the actual current waveform, the controller generating control signals as a function of the harmonic-less current waveform; and a compensator for providing compensating harmonic signals on the lines as a function of the control signal.

12. The filter of claim 11 wherein the current sensor provides periodic current signals and wherein, for each line, the extrapolator combines the most recent three current signals to determine the estimated next signal.

13. A method for eliminating harmonic currents from three phase AC supply lines, the AC lines providing actual voltage waveforms and corresponding actual current waveforms including fundamental components and harmonic components flowing through the lines connected to a load, the actual voltage waveforms characterized by a peak value, the method comprising the steps of:

sensing the currents on the three lines to generate phase current signals indicating the actual line current waveforms;

providing a compensator for providing compensating harmonic signals on the lines as a function of control signals, the compensator including a DC bus voltage source that is charged by current sinked from the lines, the DC source characterized by a minimum charge value that is greater than the peak value;

sensing the DC bus voltage and providing a DC bus voltage signal; and generating the control signals as a function of the actual line current waveforms and the DC voltage difference where the DC voltage difference is the difference between the DC bus voltage and the minimum charge value.

14. The method of claim 13 wherein the step of generating control signals includes the steps of determining the power associated with the actual current waveforms, modifying the power as a function of the DC difference and using the modified power signals to generate the control signals.

15. The method of claim 14 wherein the step of determining the power includes the steps of converting the three phase currents to two phase currents and using the two phase currents to identify both real and imaginary average reactive power components and both real and imaginary average resistive power components, the step of modifying the power includes identifying a DC bus factor that is a function of the DC difference, mathematically combining the DC bus factor and one of the real and imaginary power components to generate adjusted power signals and the step of generating the control signals includes deriving effective sine wave currents from the adjusted power signals, subtracting the effective sine wave currents from the actual currents to generate two phase harmonic current signals, transforming the two phase harmonic current signals to three phase harmonic current signals and providing the three phase signals as control signals.

16. The method of claim 15 wherein the filter is a hybrid shunt active filter and wherein the step of mathematically combining includes converting the bus factor into imaginary reactive and resistive bus factor components and adding the imaginary reactive and resistive bus factor components to imaginary reactive and resistive line power components.

17. The method of claim 15 wherein the filter is a pure shunt active filter and wherein the step of mathematically combining includes converting the bus factor into real reactive and resistive bus factor components and adding the real reactive and resistive bus factor components to real reactive and resistive line power components.

18. The method of claim 11 wherein the current sensor provides periodic current magnitude signals and wherein the controller runs a pulse sequencing program to use recent magnitude signals to determine an estimated next magnitude signal and generates the control signals as a function of the actual line current waveforms, the DC voltage difference and the estimated next magnitude signal.

19. A method for eliminating harmonic currents from three phase AC supply lines, the AC lines providing actual voltage waveforms and corresponding actual current waveforms including fundamental components and harmonic components flowing through the lines connected to a load, the actual voltage waveforms characterized by a peak value, the method comprising the steps of:

sensing the currents on the three lines to generate phase current signals indicating the actual line current waveforms;

identifying an estimated next current magnitude for each of the current signals;

providing a compensator for providing compensating harmonic signals on the lines as a function of control signals, the compensator including a DC bus voltage source that is charged by current sinked from the lines, the DC source characterized by a minimum charge value that is greater than the peak value;

using the current signals and the estimated next current magnitudes to determine a harmonic-less current waveform matching the power characteristics of the actual current waveform;

generating control signals as a function of the harmonic-less current waveform; and providing compensating harmonic signals on the lines as a function of the control signal.

20. The method of claim 19 wherein the current sensor provides periodic current signals and wherein, for each line, the step of identifying includes combining the most recent three current signals to determine the estimated next signal.

* * * * *